United States Patent
Sprangle et al.

(10) Patent No.: US 7,970,040 B1
(45) Date of Patent: Jun. 28, 2011

(54) APPARATUS FOR INCOHERENT COMBINING OF HIGH POWER LASERS FOR LONG-RANGE DIRECTED-ENERGY APPLICATIONS

(75) Inventors: Phillip A Sprangle, Great Falls, VA (US); Joseph R Penano, Springfield, VA (US); Bahman Hafizi, Bethesda, MD (US); Antonio C Ting, Silver Spring, MD (US); Richard P. Fischer, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/052,196

(22) Filed: Mar. 20, 2008

Related U.S. Application Data

(60) Provisional application No. 60/910,001, filed on Apr. 4, 2007.

(51) Int. Cl.
*H01S 3/08* (2006.01)
(52) U.S. Cl. .......................................... 372/98
(58) Field of Classification Search ....................... 372/98
See application file for complete search history.

(56) References Cited

U.S. PATENT DOCUMENTS

| | | | | |
|---|---|---|---|---|
| 5,369,659 A | * | 11/1994 | Furumoto et al. | 372/50.23 |
| 6,160,831 A | * | 12/2000 | Kleinschmidt et al. | 372/57 |
| 7,436,588 B2 | * | 10/2008 | Rothenberg et al. | 359/349 |

OTHER PUBLICATIONS

"Towards 100 kw fiber laser systems—Scaling up power in fiber lasers for beam combining," Crystal Fibre A/S, White Paper, Feb. 28, 2006.
Wickham, M., "Coherently coupled high-power fiber arrays." presented at Photonics West 2006, San Jose, CA; J. Anderegg, "Coherently coupled high power fiber arrays." In Photonics West 2006: Lasers and Applications in Science and Engineering, SPIE vol. 6102. paper 30.

\* cited by examiner

*Primary Examiner* — Minsun Harvey
*Assistant Examiner* — Patrick Stafford
(74) *Attorney, Agent, or Firm* — Amy Ressing; Suresh Koshy

(57) ABSTRACT

An embodiment of the invention includes an apparatus. The apparatus includes a plurality of lasers comprising a plurality of laser paths. The apparatus further includes an incoherent combining beam director in the plurality of laser paths. The apparatus also includes a plurality of optical elements in the plurality of laser paths between the plurality of lasers and the beam director.

6 Claims, 12 Drawing Sheets

| Power/fiber [kW] | $M^2$ | $N_{fiber}$ | $R_0$ [cm] |
|---|---|---|---|
| 3 | 1 | 33 | 8.7 |
| 5 | 7 | 20 | 11.2 |
| 20 | 38 | 5 | 22.4 |
| 100 | 1 | 1 | 50 |

FIG. 5

APPARATUS FOR INCOHERENT COMBINING OF HIGH POWER LASERS FOR LONG-RANGE DIRECTED-ENERGY APPLICATIONS

PRIORITY CLAIMS AND REFERENCE TO RELATED APPLICATIONS

This non-provisional patent application claims priority to U.S. Provisional Patent Application Ser. No. 60/910,001, filed 4 Apr. 2007, entitled "APPARATUS FOR INCOHERENT COMBINING OF HIGH POWER FIBER LASERS FOR LONG-RANGE DIRECTED-ENERGY APPLICATIONS," which provisional is incorporated herein by reference.

BACKGROUND OF THE INVENTION

1. Field of the Invention

This invention relates in general to a directed energy ("DE") laser apparatus, and in particular to a high energy laser ("HEL") apparatus involving an incoherent beam combining configuration.

2. Description of the Related Art

Recent advances in fiber lasers have made them a leading candidate for DE applications. Important characteristics of high-power fiber lasers include: i) high wall plug efficiency (>25%), ii) high CW power per fiber (~2.5 kW), iii) single mode operation (TEM$_{00}$), iv) good beam quality (M$^2$<1.2), v) compactness (0.3 m$^3$/kW), vi) satisfactory propagation wavelength ($\lambda$=1.075 µm), vii) relatively narrow linewidths ($\Delta\lambda/\lambda$~0.1%) viii) low cooling requirements, ix) low maintenance, ix) long life (diode life>10,000 hrs), and xi) low operating cost.

To achieve the power levels needed for DE applications (>100 kW, CW), it is necessary to combine a large number of fiber lasers for efficient propagation over distances of many kilometers (>5 km). Fiber lasers can be combined spectrally, coherently, or incoherently. Coherent beam combining relies on constructive interference of many lasers to produce high intensities on a remote target. It requires precise phase locking of the fiber lasers, polarization matching, very narrow linewidths ($\delta\lambda/\lambda$<10$^{-6}$) and good optical beam quality. These requirements are difficult to achieve in practice and limit the individual fiber laser power. The state-of-the-art in single-mode, single-fiber lasers having a well-defined polarization is <400 W. The propagation efficiency for coherent combining is also limited by the filling factor of the fiber array, i.e., a low filling factor results in a significant amount of optical energy in lobes outside of the central lobe. Spectral combining uses gratings to combine a large number of beams with slightly different wavelengths. This approach is limited by the fiber laser bandwidth and the requirement that the lasers have a well-defined polarization. To date, the highest total power achieved through coherent or spectral combining is less than 1 kW. Using currently available fiber lasers, a coherently or spectrally combined DE system would be complex and would require an extremely large number of lasers.

SUMMARY OF THE INVENTION

An embodiment of the invention includes an apparatus. The apparatus includes a plurality of lasers comprising a plurality of laser paths; an incoherent combining beam director in the plurality of laser paths; and a plurality of optical elements in the plurality of laser paths between the plurality of lasers and the beam director.

Optionally, the plurality of lasers comprises a plurality of single-mode fiber lasers, a plurality of multi-mode fiber lasers, a plurality of solid state lasers, a plurality of spectrally combined lasers, and/or a plurality of coherently combined lasers. Optionally, the beam director comprises a plurality of optical elements which, individually or collectively, focus and direct said plurality of laser beams to a target. Optionally, the plurality of optical elements comprises a plurality of refractive optical elements, and/or a plurality of individually controllable steering mirrors. Optionally, each laser of the plurality of lasers comprises at least a kilowatt of power. Optionally, the apparatus further comprises an airflow generator operable to generate an airflow flowing transverse to a laser propagation direction. Optionally, the plurality of optical elements comprises a plurality of groups of optical elements, each group of optical elements of the plurality of groups of optical elements being controlled independent of other groups of optical elements of the plurality of groups of optical elements. Optionally, the plurality of refractive optical elements comprises a beam expander, a beam collimator, and/or a focusing element. Optionally, the plurality of individually controllable steering mirrors is controlled by adaptive optics or tip-tilt compensation optics.

An embodiment of the instant invention has several distinct advantages over other HEL concepts. For example, incoherent combining approach is easier to implement than other beam combining approaches, e.g., coherent and spectral combining. The propagation efficiency associated with incoherent combining can be comparable to the theoretical upper limit of coherent combining. Incoherent combining according to an embodiment of the instant invention, for example, does not require phase locking between the fiber lasers and the polarization of the individual lasers can be random. The linewidths of the fiber lasers are sufficiently small to allow for propagation within the water vapor window. For low to moderate turbulence levels, the propagation efficiency, for example, is close to 100% even for multi-kilometer propagation distances. The larger beam director area permitted by an embodiment of the invention also reduces thermal distortion at the laser source, which can be a limitation for coherent combining configurations.

Incoherent beam combining of fiber lasers according to an embodiment of the instant invention is readily scalable to higher total power levels. For N incoherently combined fiber lasers, the total transmitted power is N times the power in the individual fiber and the beam director radius is R$_{BD}$=$\sqrt{N}$R$_o$. A 500 kW, laser system would consist of 100 fiber lasers (5 kW/fiber), have a beam director radius of ~40 cm and, excluding power supply, the fibers and pump diodes occupy a volume of ~8 m$^3$.

In an embodiment of the instant invention, because of the use of individually controlled steering mirrors, one beam director is optionally used to engage multiple targets simultaneously provided that the required power per target can be achieved.

An embodiment of the instant invention does not require phase locking, polarization matching, or narrow linewidths. That is, it does not require phase locking between the fiber lasers and the polarization of the individual lasers can be random. In addition, the linewidths of the fiber lasers can be relatively large. Because of these relaxed conditions, recently developed high CW power fiber lasers are optionally used. These fiber lasers can produce ~2.5 kW of CW power in a single mode (e.g., TEM$_{00}$) with high beam quality (e.g., M$^2$<1.2). Because of the large linewidths ($\delta\lambda/\lambda$~0.1%) and random polarization, these lasers cannot, however, be used for coherent or spectral combining. These single-mode fibers are optionally used for applications requiring propagation ranges of <10 km depending on atmospheric turbulence conditions. In other applications, multi-mode, higher-power fiber lasers are optionally used for applications which allow for shorter propagation ranges (e.g., <1 km).

The propagation efficiency of incoherently combined single-mode and multi-mode fiber lasers, according to an embodiment of the instant invention, can be quite high, even in moderately turbulent environments. As will be discussed below, for a given size beam director, the propagation efficiency of incoherently combined single-mode fiber lasers is practically identical to the theoretical upper limit given by that of a single Gaussian beam with a spot size equal to the radius of the beam director.

Potential applications for one or more embodiments of the invention include, for example, laser weapons, ship defense against small crafts and missiles, remote destruction of land mines and other explosives devices, mortar defense, remote welding, power beaming, and remote sensor disruption.

BRIEF DESCRIPTION OF THE DRAWINGS

FIG. 5 is a table of illustrative configurations of 100 kW systems according to the instant invention.

DETAILED DESCRIPTION OF THE INVENTION

Figure 1:
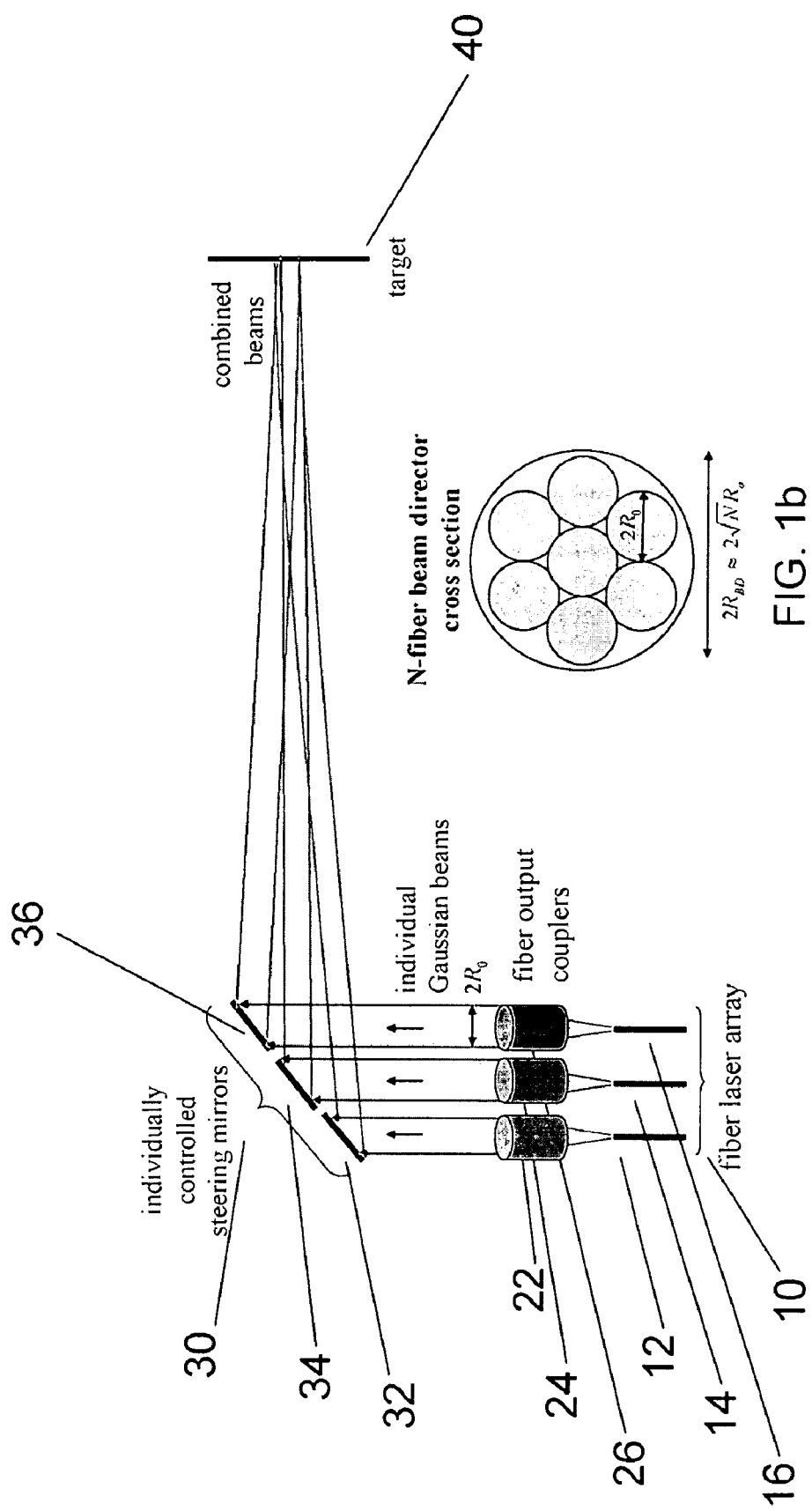
FIG. 1a is an illustrative schematic of an embodiment of the instant invention.
FIG. 1b is an illustrative cross-sectional view of an embodiment of a hexagonal beam director according to the instant invention.

An embodiment of the instant invention is shown by way of example in FIG. 1a. This embodiment takes advantage of incoherent combining of an array 10 of high-power fiber lasers 12, 14, 16. The fiber laser beams propagate into an array of fiber output couplers which contain expanding and focusing optics 22, 24, 26. The spot size of the individual lasers 12, 14, 16 at the source is made large enough so that each individual beam does not spread significantly over the propagation range. The individual beams 22, 24, 26 are directed to a target by a beam director 30, which in this embodiment includes individually controlled steering mirrors 32, 34, 36.

In an alternative embodiment, as shown by way of example in FIG. 1b, a hexagonal fiber laser array is optically coupled to a hexagonal beam director 80. Other shapes are possible, but a hexagonal array provides the smallest beam director cross-sectional area for Gaussian beams.

Figure 2:
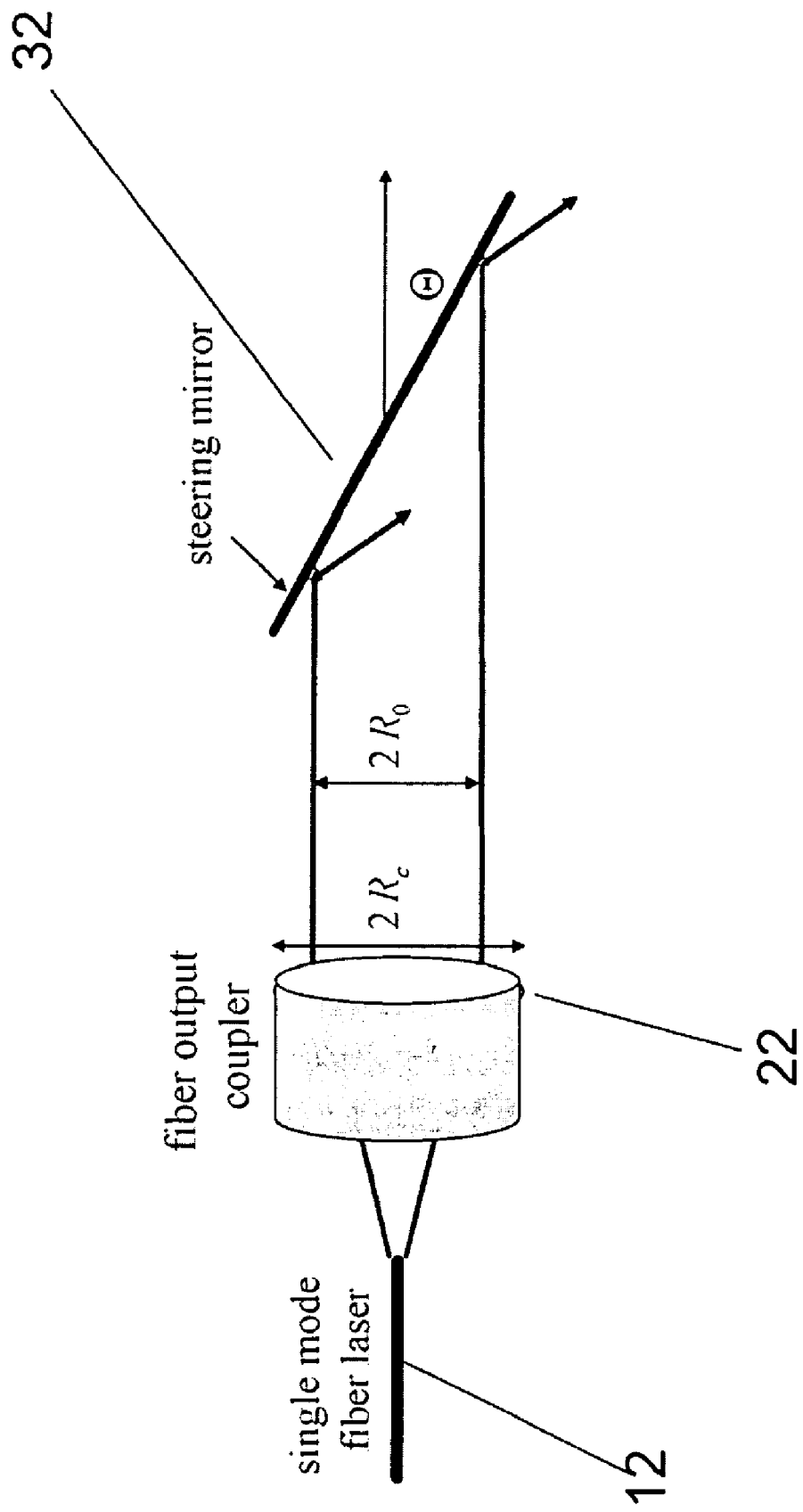
FIG. 2 is an illustrative partial schematic of an embodiment of the instant invention, showing operation of a single fiber laser.

FIG. 2 shows illustrative elements of a single fiber laser system used in the incoherent beam combining configuration. The beam exiting the fiber laser 12 has spot size of, for example, ~20 μm and a Rayleigh length of, for example, ~1.5 mm. The laser from the fiber 12 passes through a fiber output coupler 22, which expands the beam and focuses it. The beam is then directed via a steering mirror 32 onto a remote target 40. The steering mirror angle Θ is defined with respect to the propagation axis and may have a tilt error denoted by the rms value $\delta\theta_{rms} \ll 1$. To maintain high propagation efficiency, the rms angular tilt angle error associated with the individual steering mirrors must satisfy the inequality $\delta\theta_{rms} < R_{target}/L$. To maximize the propagation range, the individual lasers are Gaussian (TEM$_{00}$) modes. Other, higher power per fiber, multi-mode fiber lasers may be used for shorter propagation ranges, e.g., <1 km.

The physical processes affecting the propagation of high-power laser beams in the atmosphere are complicated and interrelated. These processes include diffraction, molecular/aerosol scattering and absorption, turbulence produced by air density fluctuations, thermal blooming, etc. The effects of these processes are well-known and it is beyond the scope of this document to consider these physical processes in detail. However, for the purpose of estimating and comparing the propagation efficiency of combined single-mode and multi-mode fiber lasers, it is possible to consider some of the more important processes in a simplified way.

Here, propagation efficiency is defined as the ratio of power on target $P_{target}$ to total transmitted laser power $P_{trans}$. It is given by the expression $$\eta_{prop} = P_{target}/P_{trans} = [1 - \exp(-2R_{target}^2/R^2(L))],$$

where $R_{target}$ is the target radius, and $R(L)$ is the laser beam spot size at a range L.

In this analysis, the time averaged laser intensity at range L is taken to have a Gaussian profile of the form $$\langle I \rangle = I_o \left(\frac{R_o}{R(L)}\right)^2 \exp\left(-\frac{2r^2}{R^2(L)}\right),$$

where $R(L) = (\Theta_{spread}^2(L)L^2 + R_o^2(1 - L/L_{focal})^2)^{1/2}$ is the long time averaged spot size at range L, $R_o$ is the initial spot size and $L_{focal}$. The laser beam spot size at a range L, when the focal length has been set equal to the range, is given by $R(L) = \Theta_{spread} L$ where the spreading angle $\Theta_{spread}$ consists of contributions from diffraction $\Theta_{diff}$, finite beam quality $\Theta_{quality}$, atmospheric turbulence $\Theta_{turb}$, mechanical jitter $\Theta_{jitter}$, and thermal blooming $\Theta_{bloom}$. In our treatment, we assume that the total spreading angle can be written in the form [11], $$\Theta_{spread} = (\Theta_{diff}^2 + \Theta_{quality}^2 + \Theta_{turb}^2 + \Theta_{jitter}^2 + \Theta_{bloom}^2)^{1/2}.$$

This expression for the spreading angle is in excellent agreement with the more exact extended Huygen's principle formulation for describing the effects of turbulence. Propagation through atmospheric turbulence results in spreading of the laser spot size and wandering of the beam centroid. The turbulence spreading angle $\Theta_{turb}$ represents the long-time average of these two effects. The fiber laser wavelength. $\lambda=1.075$ μm, is near a water vapor transmission window. $\lambda=1.045$ μm. However, in the presence of aerosols the actual transmission window is broadened and includes the fiber laser wavelength. For total power levels less than typically ~100 kW, and depending on the transverse air flow and atmospheric absorption, thermal blooming effects can usually be neglected [1]. For the purpose of discussion we will also neglect the small mechanical jitter contribution. The spreading angle due to multi-mode effects, i.e., finite beam quality, is $\Theta_{quality}=(M^2-1)\Theta_{diff}$, where the diffraction angle of a single-mode beam is $\Theta_{diff}=\lambda/(\pi R_o)$. For single-mode fibers propagating over long distances, the turbulence contribution usually dominates diffractive and beam quality spreading, $\Theta_{turb}>>\Theta_{diff}>>\Theta_{quality}$, where, for strong turbulence, $\Theta_{turb}=2\sqrt{2}\lambda/\pi r_o$, $r_o=0.33(\lambda^2/C_n^2 L)^{3/5}$ is the Fried parameter (transverse coherence length) and $C_n^2$ is the index structure constant which is a measure of the turbulence level. On the other hand, for multi-mode fibers ($M^2>>1$), the beam quality contribution to the spreading angle usually dominates, i.e., $\Theta_{quality}>>\Theta_{turb}>>\Theta_{diff}$.

These differences between single-mode and multi-mode fibers have important consequences for the propagation efficiency and the use of adaptive optics to reduce the effects of turbulence. For single-mode fibers, the use of adaptive optics can substantially improve the propagation efficiency. However, for multi-mode fibers, adaptive optics will have little effect on the propagation efficiency because the dominant contribution to the spreading angle is usually due to beam quality, not turbulence. For tip-tilt adaptive optics correction, i.e., correcting for the wander of the beam centroid, it is possible for two or more beams to share a common adaptive optics aperture provided that the beam separation is somewhat less than the transverse coherence length associated with the turbulence. For applications requiring adaptive optics, this feature can significantly reduce the size and complexity of the adaptive optics system.

Figure 3:
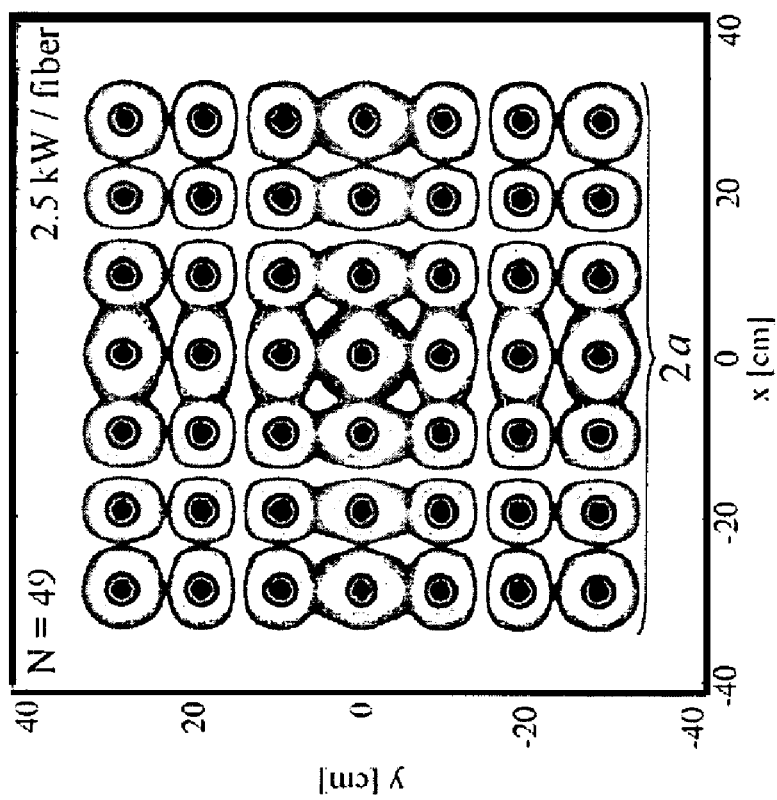
FIG. 3 is an illustrative laser intensity profile at the beam director according to an embodiment of the instant invention.

We now consider an example of a 100 kW directed energy system based on incoherent combining. In this first example, we assume single mode fibers with 2.5 kW/fiber. The target is a 100 cm² circular area at a range of 5 km. Taking the number of fibers to be N=49, the total transmitted CW power is $P_T=N P_{fiber}=123$ kW. The beam director has a square transverse profile of dimension ~60 cm×60 cm. FIG. 3 shows the laser intensity profile at the source from a computer simulation. FIG. 3 shows laser intensity profile at the beam director (z=0) for 49 fibers arranged in a square array. The Gaussian spot size of each laser is 4 cm. The individual lasers are separated by 9.6 cm. The size of the array is a=33 cm and the power per fiber is taken to be $P_{fiber}=2.5$ kW. The total transmitted power is 123 kW. The power on target is 100 kW for a target with a circular area of $A_{target}=100$ cm² at a range of L=5 km. Each beam is given an initial linewidth of ~1% and a random phase. In the absence of turbulence, the beams remain Gaussian as they propagate to the target, i.e., the intensity of each beam is given by $I(r,z)=I_0 \exp[-2r^2/R^2(z)]R_0^2/R^2(z)$.

Figure 4:
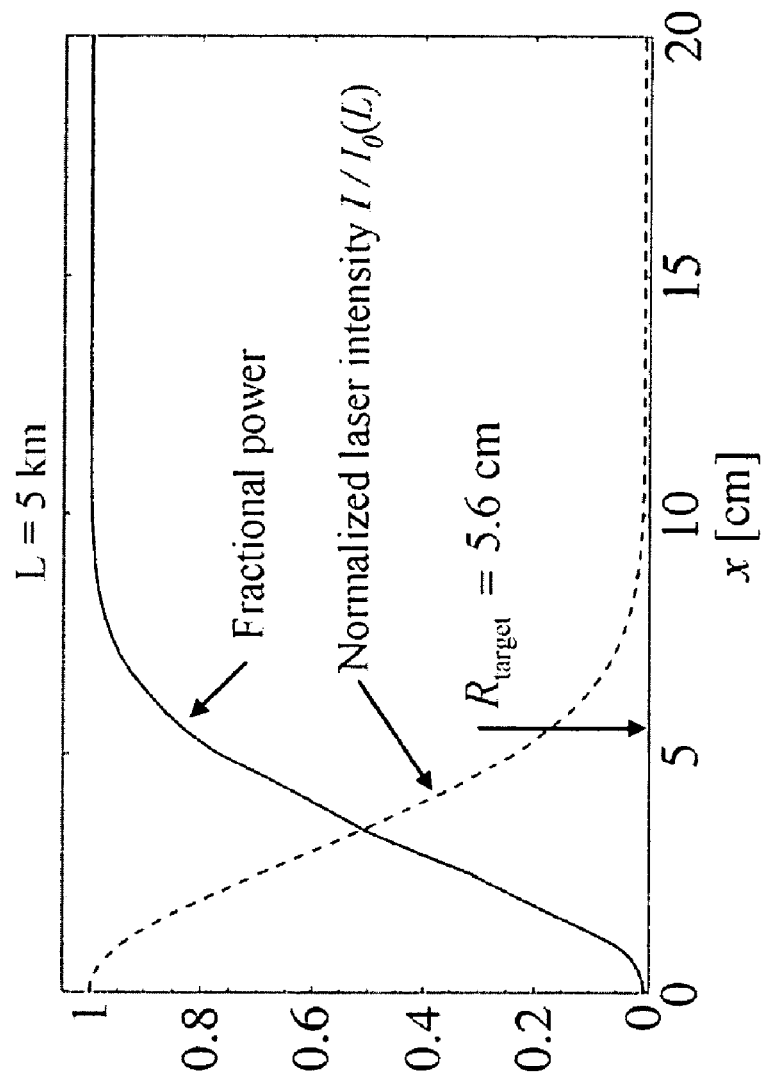
FIG. 4 is an illustrative graph plotting fractional power and normalized laser intensity versus distance.

FIG. 4 shows that the average laser intensity in the target plane (dashed curve) has a Gaussian profile. FIG. 4 plots fractional power (solid curve) and normalized laser intensity (dashed curve) versus transverse coordinate x at a range of L=5 km. The spot size of the beam is comparable to the size of the target and the propagation efficiency is ~81%, i.e., 100 kW is delivered to the target. If a coherent beam combining approach were used, the propagation efficiency would be ~40%. Fractional power is defined as the power contained within a circle of radius x normalized to the total transmitted power. The radius of a circular target with an area of 100 cm² is $R_{target}=5.6$ cm. Laser intensity is normalized to $I_0(L)=2.2$ kW/cm², which denotes the on-axis laser intensity at z=L. The power on target is 100 kW.

It is useful to compare the propagation efficiency of incoherently combined single-mode and multi-mode fiber lasers having the same size beam director and the same total power. Table I lists the parameters comparing four currently available fiber laser systems delivering at total power of 100 kW. For example, in the 3 kW/per fiber, $M^2=1$ case, 33 fibers are required. The to corresponding $M^2$ values are listed and reflect the fact that the $M^2$ increases as the modal content of the fibers increase. FIG. 5 shows an illustrative table that gives the radius of the collimating lens for the individual fiber lasers. Although in each of the cases in the table, the radius of the beam director is 50 cm, beam directors having radii greater than 50 cm or less than 50 cm are also acceptable in alternative embodiments of the instant invention. The table shows various configurations of a 100 kW system using single-mode and multi-mode fiber lasers. The table lists power/fiber, beam quality, the number of fibers required to achieve 100 kW, and the individual beam spot size at the source. Systems are labeled by shade to match propagation efficiency plotted in FIGS. 6a and 6b. The black, dashed curve in FIGS. 6a and 6b denotes an ideal Gaussian beam having a 50 cm spot-size.

Figure 6A:
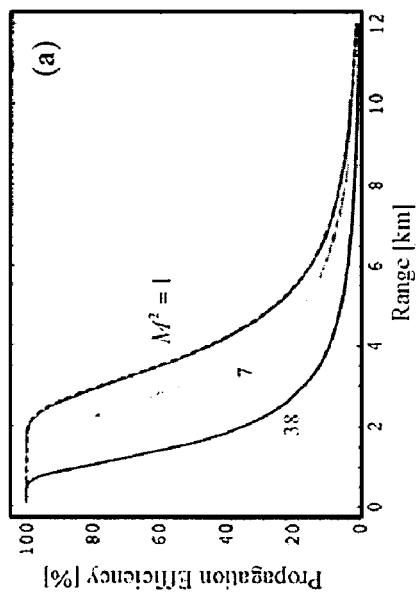
FIG. 6a is an illustrative graph plotting propagation efficiency versus range for an embodiment of the instant invention without adaptive optics.
Figure 6B:
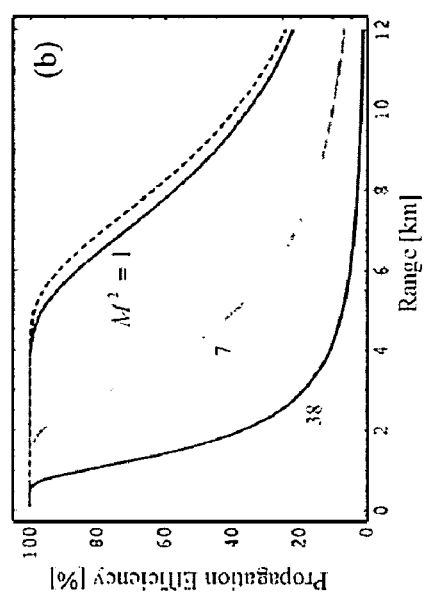
FIG. 6b is an illustrative graph plotting propagation efficiency versus range for an embodiment of the instant invention with adaptive optics.

An illustrative propagation efficiency is plotted in FIGS. 6a and 6b as a function of range for incoherently combined fiber laser beams in a moderately turbulent atmosphere, $C_n^2=10^{-14} m^{-2/3}$. FIGS. 6a and 6b show the efficiency for various values of beam quality, $M^2=1$, 7 and 38. FIGS. 6a and 6b show the efficiency without adaptive optics and with adaptive optics, respectively. The dashed curves are for a single Gaussian beam with initial spot size equal to the radius of the beam director and represents the theoretical upper limit for both coherent and incoherent combining, that is, the optimal beam profile for propagation. The single-mode incoherently combined example ($M^2=1$, red curve) has a propagation efficiency which is virtually identical to that of the single Gaussian beam (dashed curve), while the propagation efficiency of the various multi-mode fibers is significantly less. In all cases shown in FIGS. 6a and 6b, the total power is 100 kW, the radius of the beam director is $R_{BD}=\sqrt{N}R_o=50$ cm, and the target is a circular disc with and area of 100 cm².

FIGS. 6a and 6b show that the use of adaptive optics can greatly improve the propagation efficiency of combined single-mode fibers but has little effect on the efficiency of combined multi-mode fiber lasers. Adaptive optics was incorporated into the results shown in FIG. 6b by increasing the Fried parameter by a factor of four. For the same size beam director, it can be shown that the spreading angles for single-mode incoherently combined and coherently combined beams are essentially identical when $r_o<<R_{BD}/\sqrt{N}$. This condition is satisfied for typical atmospheric turbulence levels and propagation ranges. Therefore, there is no inherent advantage in coherently combining beams. In a vacuum, the propagation efficiency for the single Gaussian beam (dashed) and single-mode incoherently combined beams (red) is nearly 100% for ranges less than 8 km.

Figure 7:
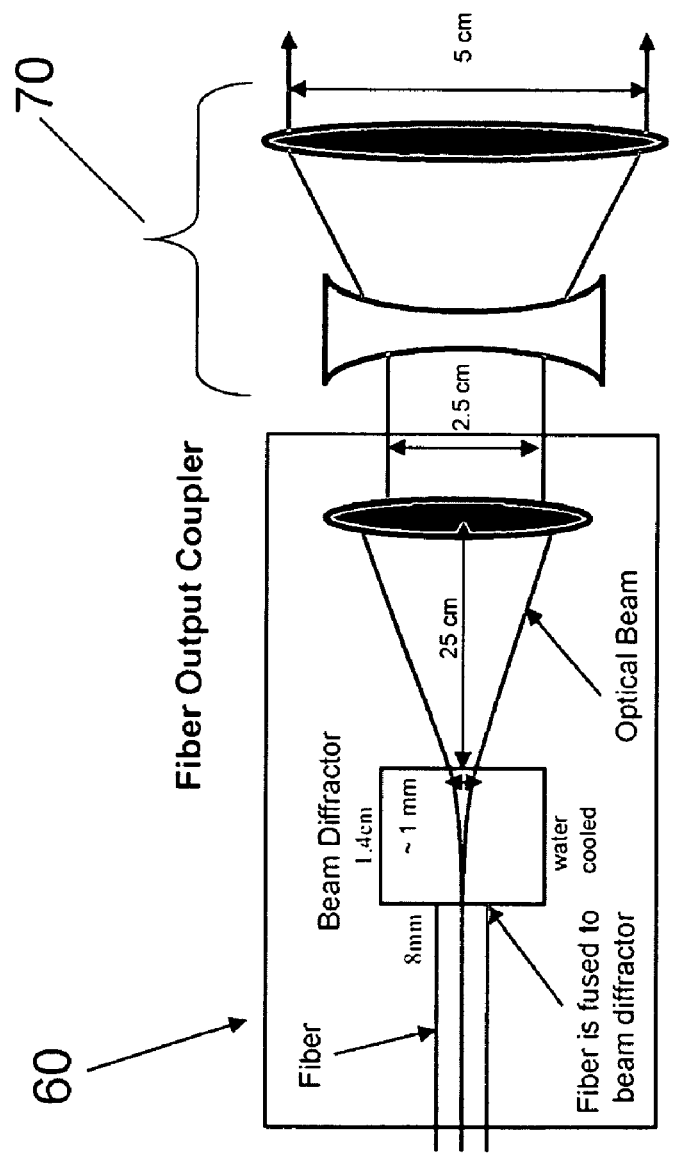
FIG. 7 is an illustrative schematic of a fiber output coupler according to an embodiment of the instant invention.

Another embodiment of the invention, shown by way of example in FIG. 7, includes four IPG Photonics branded single-mode fiber lasers having a total output power of 6.2 kW (e.g., 1 kW, 1.6 kW, 1.6 kW and 2 kW, respectively). Over a propagation range of 1.2 km through a moderately turbulent environment, the embodiment demonstrated ~90% propagation efficiency for ~3 kW of transmitted laser power on 2 Nov. 2007 at the Naval Surface Warfare Center at Dahlgren, Va. (the "Dahlgren experiments").

The beam director 30 according to this embodiment of the invention includes four fiber output couplers 60, (only one of which is shown in FIG. 7) four beam expanders 70, (only one of which is shown in FIG. 7) and four individually controlled steering mirrors which direct the four single-mode fiber laser beams onto a target. The beam expanders used in this example are 2×, and can be adjusted to vary the focal length of each beam. Each beam has a spot size of ~2.5 cm as it exits the beam expander and the target is a 10 cm radius water-cooled power meter.

FIG. 7 shows a schematic of the fiber laser output coupler 60 and the beam expander 70 (e.g., a concave-convex lens combination) which is used to adjust the focal length. Thermal effects in the beam director limit the total transmitted power. Thermal effects cause an axial shift of the focus with time as the total laser power was increased to ~3 kW. The change in the focal length is optionally compensated for by changing the separation between the lenses in the beam expander. Thermal effects near the beam director output can be mitigated by inducing an air flow transverse to the laser propagation path.

Figure 8:
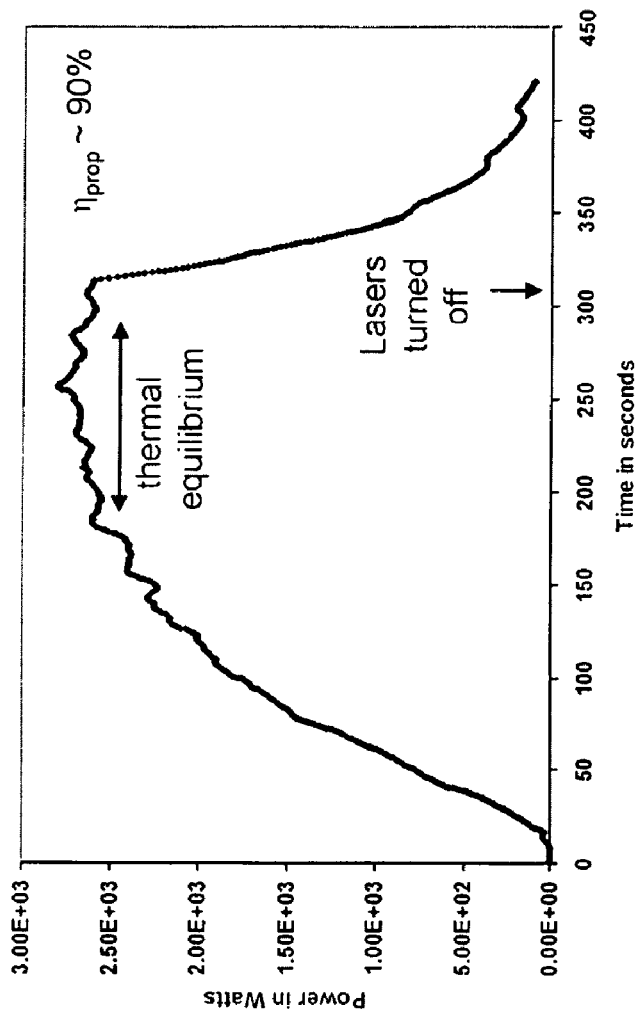
FIG. 8 is an illustrative graph plotting measured power at target versus time for an embodiment of the instant invention used in the Dahlgren experiments discussed below.

Measured power on target as a function of time as determined in the Dahlgren experiments is shown in FIG. 8. The target was a power meter with 45 sec response time and 10 cm radius. The conditions were as follows: average wind speed of ~2.5 m/sec, and measured turbulence strength $C_n^2 = 5 \times 10^{-14}$ $m^{-2/3}$. After the output coupler reached thermal equilibrium (>200 sec) the measured power was 2.8 kW, corresponding to a propagation efficiency of ~90%. Air turbulence caused the beams on the target to wander and change shape with time. At times, the four beams completely overlapped forming a single spot. At other times, four individual beams were observed separated by a few centimeters. Since the mechanical jitter angle was measured to be less than ~2 μrad, the beam centroid wander was caused by atmospheric turbulence. The power rise time was due to the finite power meter response time as well as thermal effects in the beam director. The fluctuations on the measured power were due to water temperature variations.

Figure 9A:
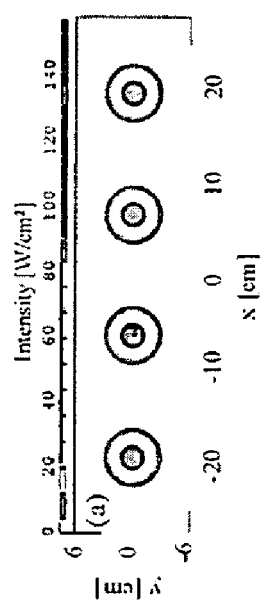
FIG. 9a is an illustrative graph, obtained from numerical simulation of the Dahlgren experiments, plotting an intensity profile of laser beams at a source according to an embodiment of the instant invention.
Figure 9B:
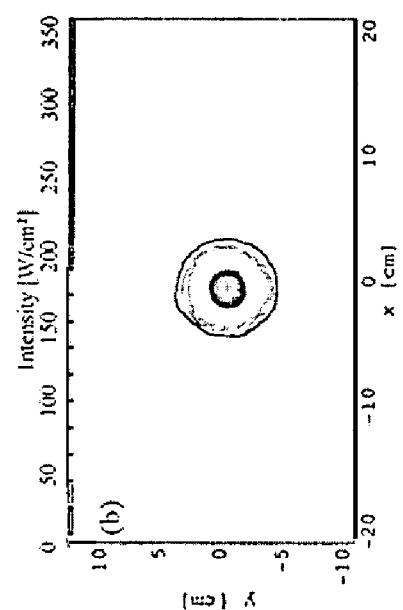
FIG. 9b is an illustrative graph, obtained from numerical simulation of the Dahlgren experiments, plotting an intensity profile of incoherent combination of the laser beams on a target according to an embodiment of the instant invention.
Figure 10:
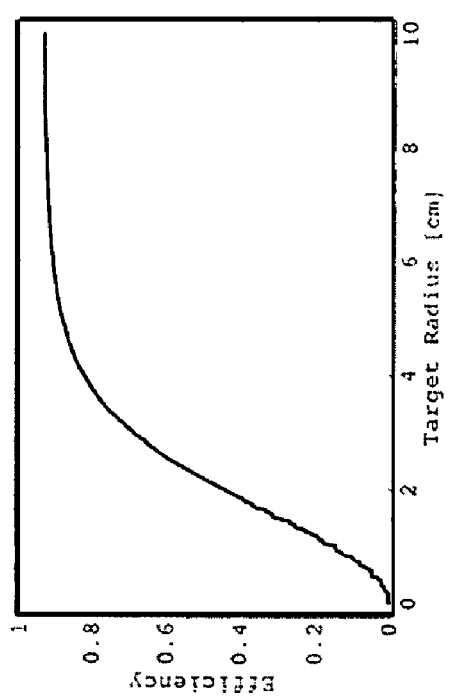
FIG. 10 is an illustrative graph plotting propagation efficiency versus target radius for an embodiment of the instant invention.

FIGS. 9a and 9b show illustrative results of simulations for incoherent combining of the four laser beams with a total power of 3 kW, over a range of 1.2 km, in a turbulent atmosphere with $C_n^2 \approx 5 \times 10^{-14}$ $m^{-2/3}$, an average cross-wind speed of 2.5 m/sec and mechanical jitter angle of 2 μrad, i.e., conditions measured during the Dahlgren experiments. The simulation code used to mode the experiments was the Navy's High Energy Laser Code for Atmospheric Propagation to (HELCAP). The aerosol scattering coefficient was taken to be 0.05 $km^{-1}$. The individual initial spot size is 2.5 cm and the combined spot size on target is ~5 cm. FIG. 9a shows the intensity contours of the four beams at the fiber laser output coupler. The focal length of each beam is adjusted to yield the minimum spot size on target. FIG. 9b shows time-averaged (over a few seconds) intensity contours of the combined laser beam on the target plane. The combined beam at 1.2 km has a radius of ~4 cm, only slightly larger than each of the individual beams at the beam director. The intensity profile as a function of time shows the wandering of four beams, each with excursion of ~3 cm. These simulation results are very similar to those observed in the experiments.

Figure 11:
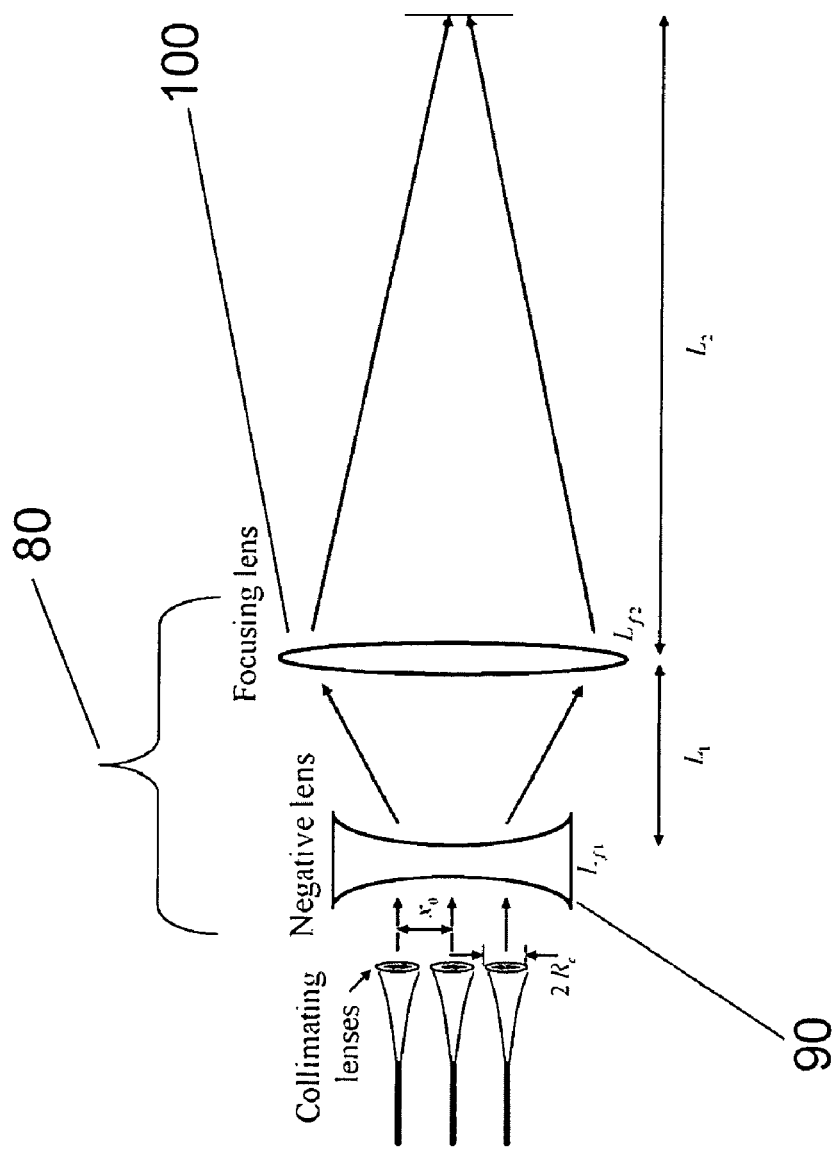
FIG. 11 is an illustrative beam director involving a hybrid spectral combining and incoherent combining configuration according to an embodiment of the instant invention.

FIG. 11 plots an illustrative propagation efficiency contained within a given radius as a function of the radius, that is, propagation efficiency (ratio of power on target to transmitted power) versus target radius for the simulation of FIG. 7. Total transmitted power is 6.2 kW. Power within a 10 cm radius target at 1.2 km range is 5.8 kW, which corresponds to a propagation efficiency of 94%. Approximately 94% of the transmitted power is contained within a radius of ~10 cm on the target plane. In the absence of aerosol scattering, the propagation efficiency for a 10 cm target is ~100%.

In another embodiment of the invention, tip-tilt adjustments are optionally added into one or more of the fiber laser beams to correct for wandering of the beam centroid.

Thermal blooming of high-power laser beams under certain conditions can represent an important limitation to DE systems. Thermal blooming experiments can be carried out using a stagnation tube to eliminate the cooling effects of transverse air flow. This arrangement permits thermal blooming effects to be observed at relatively low power levels in a controlled setting. Analysis indicates that a 5-meter-long stagnation tube at the source results in observable laser beam spreading on the target at a range of 1.2 km. The temporal change in the laser spot size and intensity provide the necessary scientific data to study thermal blooming under realistic conditions.

In an embodiment of the instant invention, the incoherent combining is optionally implemented using commercially available high-power fiber lasers for directed energy applications requiring multi-kilometer-range propagation of kW levels of CW power. These high-power fiber lasers are robust, compact, and have a long operating life (e.g., diode life>10,000 hrs). In addition, they have high wall plug efficiency (e.g., >25%), high CW power (e.g., ~2.5 kW), good beam quality (e.g., $M^2 < 1.2$), satisfactory propagation wavelength (e.g., $\lambda = 1.075$ μm, low cooling requirements, low maintenance, and low operating cost.

In another embodiment of the instant invention, the individually controlled steering mirrors in FIG. 1 are optionally replaced with ones whose radius of curvature are adjustable (i.e., individual adaptive-optic elements). In another embodiment of the instant invention, the fiber lasers are optionally replaced by other types of solid state lasers. In another embodiment of the instant invention, other wavelengths (e.g., eye-safe wavelengths) are optionally used by tuning the fiber lasers. In another embodiment of the instant invention, higher-power (e.g., multi-kW) multi-mode fiber lasers are optionally used for shorter range (e.g., ~100 m) applications.

In another embodiment of the instant invention, an alternative beam expander 70 involving a plurality of collimated fiber laser beams sharing a zoom lens configuration 80 for incoherently combined fiber lasers is shown by way of example, in FIG. 11. A negative lens 90 with focal length $L_{f1}$ is placed a distance $L_1$ from a focusing lens 100 with focal length $L_{f2}$. The focal length of the configuration, $L_2 = L_{f2}(L_1 + L_{f1})[L_1 + L_{f1} - L_{f2}]^{-1}$ can be varied by changing $L_1$. In this configuration, the focal length of the shared fiber array is controlled by moving one lens, thus reducing the complexity of the overall beam director.

Figure 12:
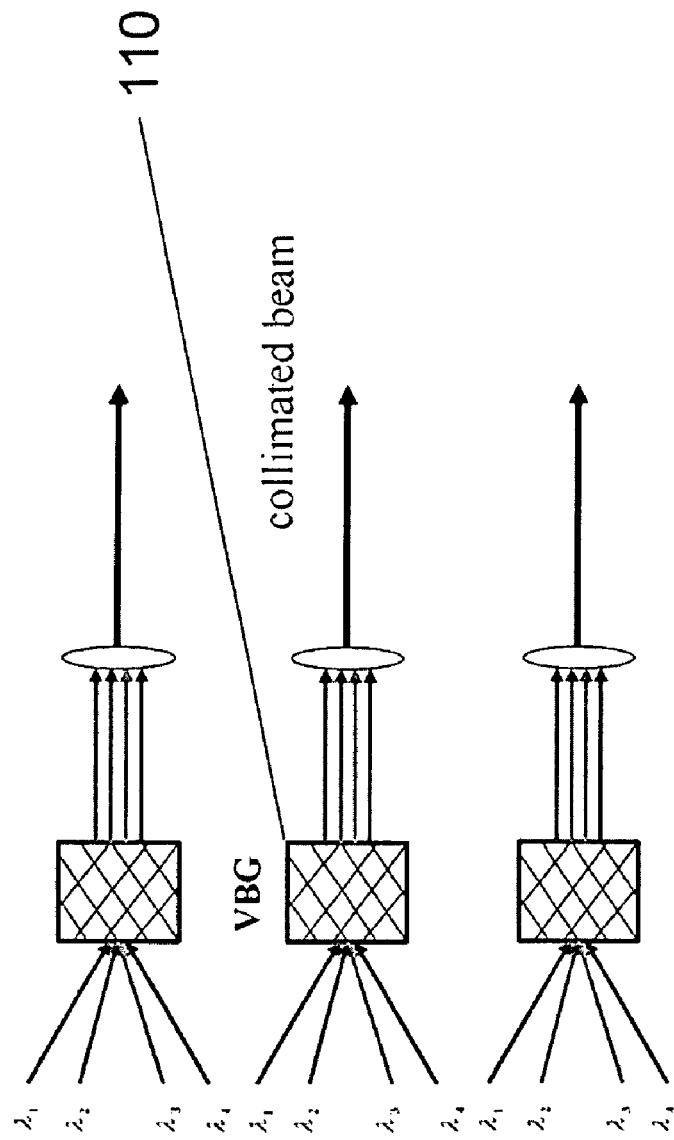
FIG. 12 is an illustrative zoom lens beam director according to an embodiment of the instant invention.

FIG. 12 illustratively shows, for an another embodiment of the instant invention, a hybrid spectral combining and incoherent combining configuration which would result in a more compact beam director 30, than discussed in other embodiments above. Individual fiber lasers at various wavelengths are spectrally combined using a volume Bragg grating ("VBG") 110. The spectrally combined beams are incident upon collimating lenses. The collimated beams can then be incoherently combined.

The many features and advantages of the invention are apparent from the detailed specification, and thus, it is intended by the appended claims to cover all such features and advantages of the invention which fall within the true scope and spirit of the invention. Further, because numerous modifications and variations will readily occur to those skilled in the art, it is not desired to limit the invention to the exact construction and operation as illustrated and described, and accordingly, all suitable modifications and equivalents may be resorted to, falling within the scope of the invention.

What is claimed is:

1. An apparatus comprising:
a plurality of lasers comprising a plurality of laser paths;
an incoherent combining beam director in said plurality of laser paths;
a first plurality of optical elements free of a spectral combining grating in said plurality of laser paths between said plurality of lasers and said beam director, and
one of adaptive optics and tip-tilt compensation optics,
wherein said beam director comprises a second plurality of optical elements which one of individually and collectively focus and direct said plurality of laser beams to a target, each optical element of said second plurality of optical elements individually focusing and directing a respective laser path of said plurality of laser beams to the target,
wherein said second plurality of optical elements comprises a plurality of refractive optical elements, and a plurality of individually controllable steering mirrors, said one of adaptive optics and tip-tilt compensation optics controlling said plurality of individually controllable steering mirrors to correct for wander of a beam centroid associated with turbulence produced by air density fluctuations,
wherein each steering mirror of the plurality of individually controllable steering mirrors corresponds to the respective laser path.

2. The apparatus according to claim 1, wherein said plurality of lasers comprises one of a plurality of single-mode fiber lasers, a plurality of multi-mode fiber lasers, a plurality of solid state lasers, a plurality of spectrally combined lasers, and a plurality of coherently combined lasers.

3. The apparatus according to claim 1, wherein each laser of said plurality of lasers comprises at least a kilowatt of power and comprises a random polarization.

4. The apparatus according to claim 1, further comprising an airflow generator operable to generate an airflow flowing transverse to a laser propagation direction.

5. The apparatus according to claim 1, wherein said plurality of optical elements comprises a plurality of groups of optical elements, each group of optical elements of said plurality of groups of optical elements being controlled independent of other groups of optical elements of said plurality of groups of optical elements.

6. The apparatus according to claim 1, wherein each refractive optical element of said plurality of refractive optical elements comprises a beam expander, a beam collimator, and a focusing element, said each refractive optical element corresponding to the respective laser path.

* * * * *